(12) United States Patent
Drechsel

(10) Patent No.: US 8,301,308 B2
(45) Date of Patent: Oct. 30, 2012

(54) COMPUTERIZED METHOD FOR MAKING CHANGES TO AN IRRIGATION SYSTEM AND APPARATUS FOR IMPLEMENTING SUCH METHOD

(75) Inventor: Arno Drechsel, Lienz (AT)

(73) Assignee: IWT Innovative Water Technologies, Lienz (AT)

( * ) Notice: Subject to any disclaimer, the term of this patent is extended or adjusted under 35 U.S.C. 154(b) by 263 days.

(21) Appl. No.: 12/739,947

(22) PCT Filed: Nov. 14, 2008

(86) PCT No.: PCT/IB2008/054785
§ 371 (c)(1),
(2), (4) Date: Apr. 26, 2010

(87) PCT Pub. No.: WO2009/063431
PCT Pub. Date: May 22, 2009

(65) Prior Publication Data
US 2010/0262305 A1 Oct. 14, 2010

(30) Foreign Application Priority Data
Nov. 14, 2007 (IT) .............................. VI2007A0298

(51) Int. Cl.
*G06F 19/00* (2011.01)
(52) U.S. Cl. ......................................... 700/284; 700/84
(58) Field of Classification Search .................. 700/284, 700/23, 84; 239/210, 222.17, 222.21
See application file for complete search history.

(56) References Cited

U.S. PATENT DOCUMENTS

| | | | | |
|---|---|---|---|---|
| RE33,746 E | * | 11/1991 | Lucas | 239/744 |
| 5,740,038 A | * | 4/1998 | Hergert | 700/284 |
| 5,917,603 A | * | 6/1999 | Tanaka et al. | 356/388 |
| 7,051,952 B2 | * | 5/2006 | Drechsel | 239/256 |
| 2002/0066810 A1 | | 6/2002 | Prandi | |
| 2004/0089735 A1 | * | 5/2004 | Drechsel | 239/195 |

OTHER PUBLICATIONS

PCT, International Search Report.
PCT, Written Opinion of the International Searching Authority.

* cited by examiner

*Primary Examiner* — Kidest Bahta
(74) *Attorney, Agent, or Firm* — Themis Law

(57) ABSTRACT

The present invention relates to a computerized method for operating changes to an irrigation system. The method includes the steps of: providing a computer processing apparatus having storage media; installing a computer program product for sizing and changing the system; loading a general database of components susceptible of being used in the system onto the storage media; loading an initial combination of components defining the configuration of the system before the change; introducing technical specifications about the final configuration of the system into the computer program product; operating one or more changes to the system in accordance with the technical specifications of the final configuration thereof. The computer program product is designed to provide a first list of components concerned by the changes and a second list containing the changes.

35 Claims, 3 Drawing Sheets

COMPUTERIZED METHOD FOR MAKING CHANGES TO AN IRRIGATION SYSTEM AND APPARATUS FOR IMPLEMENTING SUCH METHOD

FIELD OF INVENTION

The present invention generally addresses the technical filed of irrigation systems and relates to a method for operating changes to such a system.

More particularly, the present invention is aimed at providing a method that allows changes to be operated to the design of an irrigation system, either partial or complete, which is particularly useful when the system to be changed is in operating conditions.

The present invention also relates to a processing apparatus for implementing the above method.

BACKGROUND OF THE INVENTION

Irrigation systems are known to be used in agriculture for watering crops. In the case of large crops, irrigation systems are of adequate size, and generally consists of pivot or linear type systems.

More in detail, FIG. 1 shows an irrigation system I, which is composed by assembling a plurality of different components, including one or more tubing spans A operably arranged in series, the first of which is connected to the water source for drawing water. Further components may include means for propelling and distributing water, which generally consist of a gun sprinkler associated with the last tubing span A, sprinkling water over the soil with the help of a booster pump, and distributors B, one example whereof may be seen in FIG. 2, which are associated in variable numbers with each span A and are suitable to sprinkle water onto the underlying soil.

Also, these distributors B are in turn composed of a plurality of components E. These latter are formed of various shapes, sizes and materials, to provide distributors suitable to meet any requirement, i.e. distributing particular amounts of water from a predetermined height, according to the specific crops, with the amount of available water and with the current water pressure.

Therefore, an irrigation system appears to be a complex assembly of a large number of different types of components whose selection requires particular care. According to the prior art, such system is designed by technical experts who know all available components and their features.

During design, the expert first chooses the components in view of ensuring mechanical continuity of the system, i.e. taking care that the selected components can be assembled together. Furthermore, the expert selections shall be such to ensure proper operation of the system, which means that they shall comply with technical specifications such as pressure, amount of water to be distributed upon each individual location, height of each distributor from the ground, according to users' requirements.

It is also known that changes are often required to be operated to the design of an irrigation system, regardless of whether it is in operating conditions or not.

It often occurs that technical specifications are wrong or no longer applicable. It may occur, for example, that the specifications provided by the user are incorrect or that crops have been changed, and require a different amount of water and/or a different type of distributors, or also that pressure and availability of water have changed with time.

In any case, according to the prior art the designer shall rely on its expertise to operate changes while ensuring that the new specifications are met without having to start the design anew.

These changes generally consist in the displacement of one or more distributors, the addition of new distributors and/or the change of some of those provided at the beginning.

According to the prior art, the result of all the above is a comprehensive list of all the components required to make the system.

It is understood that, when changes are operated to an irrigation system in operating conditions, such process involves a first drawback in that the task of the person in charge with ordering any new components is complicated. In this case, the person in charge has to make a comparison between the list of components of the operating system and the list of components of the changed system to obtain the list of the components required to operate the changes.

These lists shall be also used by the technician that is charged of implementing the changes in the field, to determine the steps to be carried out, i.e. which components have to be replaced, where new components have to be added and, if needed, which components of those provided before have to be displaced.

It can be easily noted that the above process is particularly burdensome and time-consuming and often causes the technician to make errors.

Furthermore, at the end of the process the technician might also realize that the changes that have been operated do not achieve the intended goals. Indeed, in known systems there is no way to check that the changes that have been operated are sufficient to achieve the desired results.

A particularly remarkable exemplary case is when changes concern the pressure and/or amount of water available to an operating irrigation system. In this situation, the prior art generally requires a technical expert to rely on his/her expertise to change the configuration of the system in the field, because the known computer program products cannot provide any useful information.

These changes generally consist in the displacement of certain components, particularly the distributors, and in different flow adjustments thereof.

Such process appears to be highly burdensome and time-consuming for field technicians. Furthermore, the final result is uncertain and provides no assurance that the system has been appropriately changed to fulfill the new requirements.

SUMMARY OF THE INVENTION

The object of this invention is to overcome the above drawbacks, by providing a method for operating changes to an irrigation system.

A particular object of the present invention is to provide a method for operating changes to an irrigation system that speeds up the tasks of the designer, the personnel charged with new component orders and the technicians that implement changes in the field. The method that is intended to be conceived essentially provides savings in terms of human resources and work time and, eventually, money.

Particularly, the object is to provide a method for operating changes to an irrigation system that allows those that have the task of ordering any new components to supply the technicians, that will implement the changes in the field, only with the components required by the changes, without incurring in any error, and minimizing the time to be allocated for this task.

Another object to be fulfilled is to allow field technicians to adequately operate all the changes without incurring the risk of making errors and without the need of interpreting the new design to determine which parts of the system are to be changed.

These and other objects, as better explained hereafter, are fulfilled by a computerized method for operating changes to an irrigation system as described hereinafter.

Particularly, this computerized method for operating changes to an irrigation system, wherein said system comprises a movable bearing structure having a plurality of hydraulic components for water supply and distribution to the soil to be irrigated, comprises the following steps:

providing a computer apparatus, having one or more storage media; installing, into said computer apparatus, a computer program product for sizing and changing the system;

loading, onto one of said storage media, a general database of components susceptible of being used in the system;

loading, onto one of said storage media, an initial combination of said components defining the configuration of the system before the change;

providing said computer program product with technical specifications about the final configuration of the changed system;

providing one or more changes to said system in accordance at least with said technical specifications of the final configuration of the changed system, and is characterized in that said computer program product is designed to provide at least one first list of said components concerned by said changes and at least one second list containing said changes.

More in detail, the changes may include addition, removal or replacement of one or more components as compared with the components that define the configuration of the original system, their location, new location data of one or more of the components that define the original system configuration, partial replacement of certain components, e.g. replacement of certain parts of one or more distributors.

Thanks to the automatic generation of the first list a simplified management of the orders of new components is allowed that requires neither time nor concentration from those that handle such orders. Furthermore, this will provide the certainty that the order is correct.

The composition of the second list further provides precise and accurate indications to the field technicians, who are no longer required to compare the two designs to determine which changes have to be operated to the system.

They will further be able to accomplish their tasks with the certainty of not incurring misinterpretation errors.

Particularly, the changes implemented in the field to fit different water flow rates, pressures and available water amounts do not rely on the expertise of the individual technician, but are uniquely determined during the design changing process.

It shall be noted that since the second list contains all the indications required to operate changes to the system, such changes may be operated by the user, without requiring the intervention of a technician.

In one aspect of the invention, these changes are imposed by the designer according to his/her own expertise, with reference to the mechanical and hydraulic parameters of the components contained in the general database.

According to another aspect of the invention, the computer program product can help the designer in this task by allowing the step of operating changes to occur by selecting new components from a group of sets of components contained in the general database. Each of these sets is processed by the computer program product by selecting, among all the available components, those having at least mechanical features, and possibly also hydraulic features, compatible with the technical specifications of the final configuration of the changed system, with the components that define the configuration of the system before the change and remain in the final configuration of the changed system, and with the new components previously selected during such step of operating changes, in view of ensuring mechanical, and possibly hydraulic, continuity of the changed system during assembly thereof.

Preferably, the computer program product also contains a subcomputer program product that can compute the hydraulic parameters of the changed system to ensure fulfillment of the changed technical specifications.

By this arrangement, the designer is assisted in the selection of new components by the computer program product which totally excludes incompatibility between the newly selected components and the system to be changed, while ensuring that the final result meets users' requirements.

Conveniently, one or more of these changes may be arranged to be operated autonomously by the computer program product, which will relieve the designer from this task. It will be particularly appreciated that, in such condition, the step of changing the design and of placing any order for the purchase of new components may be carried out by the user with the certainty that the final result is correct.

It shall be noted that the above mentioned purposes are achieved by a computer program product that can be directly controlled within the memory of a computer and comprises portions of software code for implementing the above method.

Furthermore, these purposes are fulfilled by a computer apparatus for computerized change of the design of an irrigation system of the type comprising a movable bearing structure having a plurality of hydraulic components for water supply and distribution to the soil to be irrigated. Such computer apparatus is characterized by comprising:

one or more storage media for storing at least one computer program product for the design of said irrigation system and which comprises a general database of components susceptible of being used into the irrigation system;

first loading means, into said storage media, for loading an initial combination of said components defining the configuration of the system before the change;

second loading means, into said computer program product, for loading technical specifications about the final configuration of the changed system;

at least one computer unit for running said computer program product to process one or more changes of said system according to at least said technical specifications of the final configuration of the changed system, and to provide at least one first list of said components concerned by said changes and at least one second list containing said changes;

display means for displaying said lists.

BRIEF DESCRIPTION OF THE DRAWINGS

Further features and advantages of the invention will be more apparent from the detailed description of a few preferred and non-exclusive embodiments of a computerized method for changing an irrigation system according to the invention, which are shown as non-limiting examples with the help of the annexed drawings, in which.

DETAILED DESCRIPTION OF A PREFERRED EMBODIMENT

The method of the invention is suitable to be implemented by a computer apparatus, also covered by this invention, for computerized change of a design of an irrigation system I of the type comprising a movable bearing structure having a plurality of hydraulic components for water supply and distribution to the soil to be irrigated.

Figure 1:
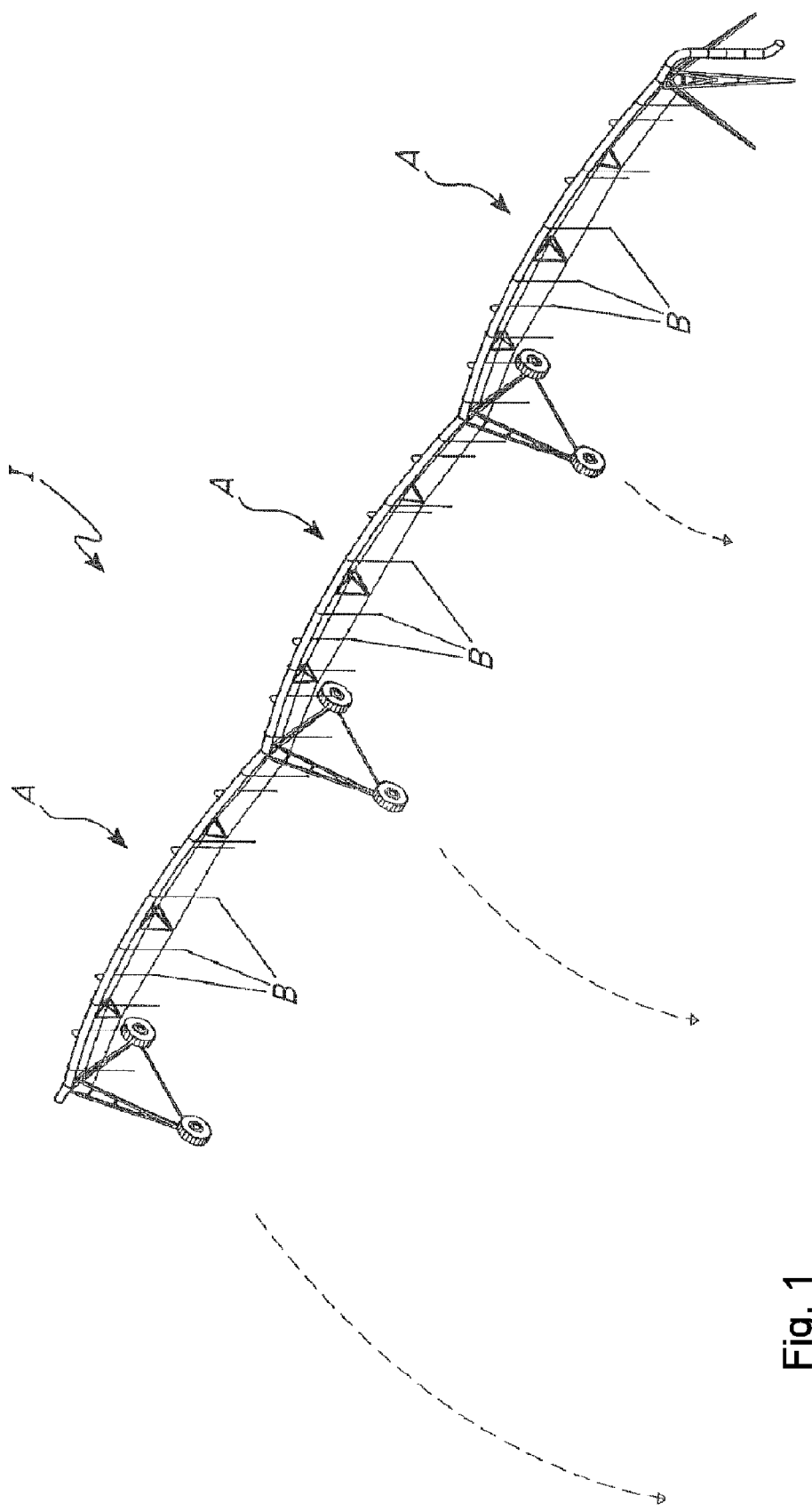
FIG. 1 shows an irrigation system adapted to be changed using the method and the apparatus of the invention.
Figure 2:
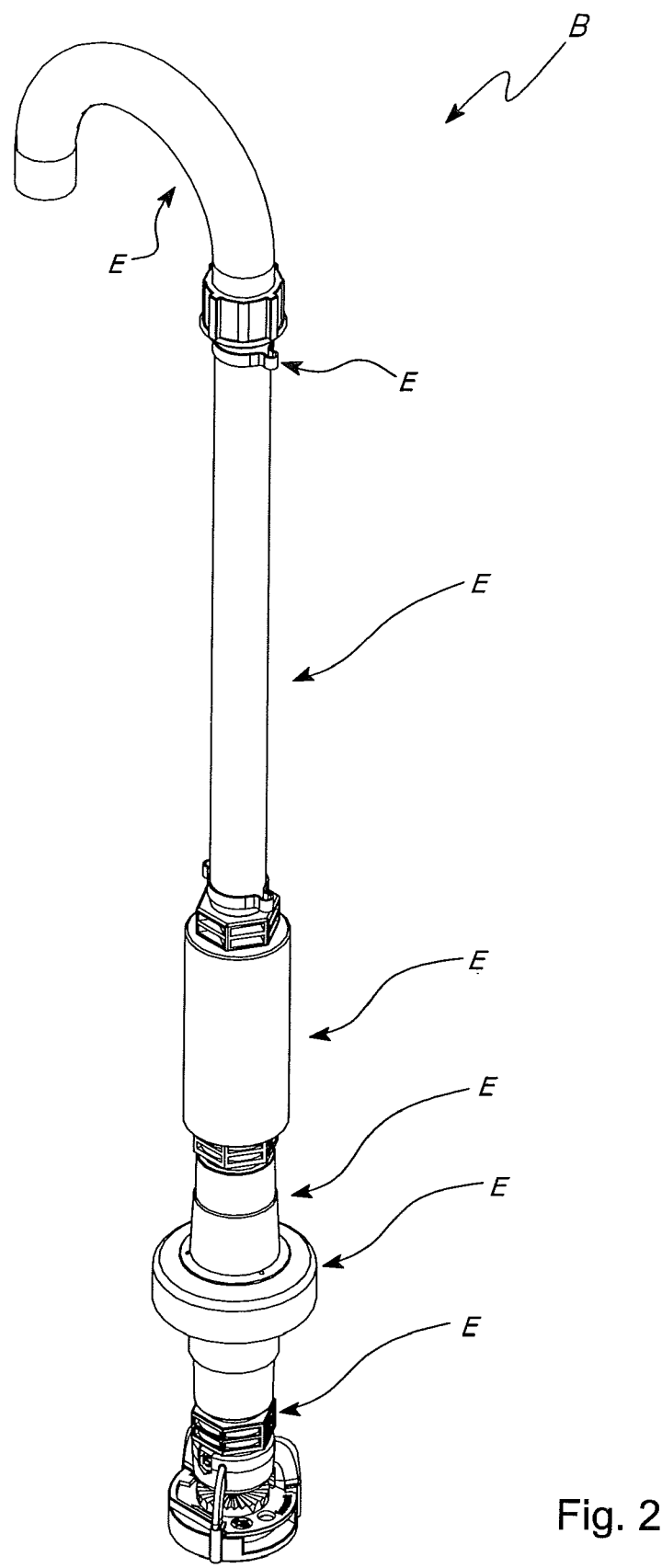
FIG. 2 is an axonometric view of a detail of FIG. 1.
Figure 3:
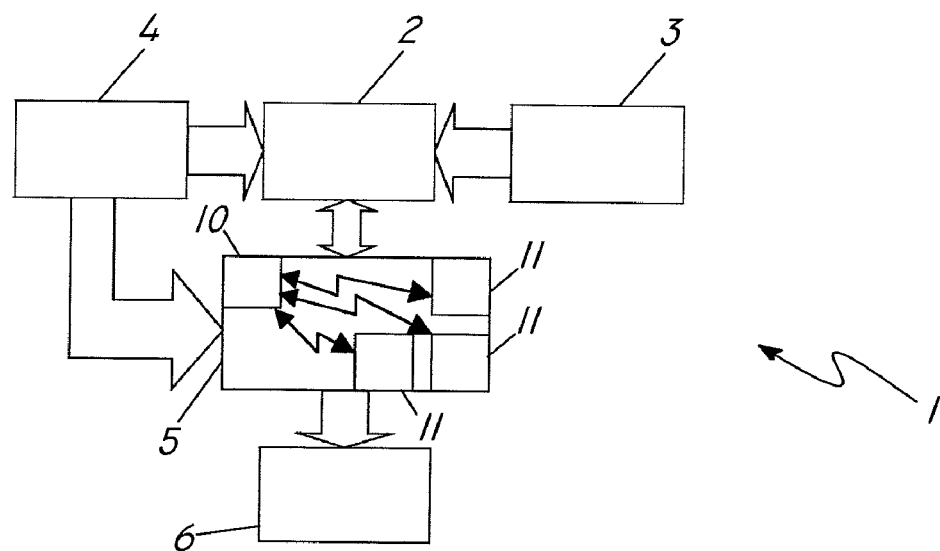
FIG. 3 shows a block diagram of the apparatus of the invention.

Referring to FIG. 3, the apparatus 1 of the invention comprises:

storage media 2 for storing a computer program product for the design of the irrigation system I, which comprises a general database of components susceptible of being used in the system I;

first loading means 3, into the storage media 2, of an initial combination of components defining the configuration of the system I before the change;

second loading means 4, into said computer program product, of technical specifications about the final configuration of the changed system I;

a computer unit 5 for running the computer program product, first to process one or more changes of the system I according to the technical specifications of the final configuration, and then to provide a first list of components concerned by the changes and a second list containing such changes in detailed form;

display means 6 for displaying the lists.

Thus, conveniently, the generation of the first list, with any new components required for the changes, and the second list, with an accurate description of all the changes to be made, considerably facilitates the tasks of order management personnel and field technicians. This obviously prevents any error by these persons.

The computer unit 5 preferably comprises at least one central computer server 10 and one or more client computers 11 that can be connected to such central computer server, for instance via web access. Here, access occurs through an authentication procedure, which also provides a dedicated storage space to each user. This will allow each user to save his/her own designs and preferred configuration, that may be recalled at any later time.

This also provides the advantage of having the certainty that the general database loaded in the server 10 is always up-to-date.

The above shall not be intended to restrict different embodiments of the invention, in which the computer unit comprises a computer, generally owned by the user, i.e. a designer or user of the system, with the computer program product installed therein. In this case, the general database of components will be updated by the user.

Preferably, the computer program product that is run by the apparatus 1 of the invention may include a subcomputer program product suitable to operate one or more changes. The apparatus may be also equipped with selector means available to an operator. In this way, such operator is also able to operate one or more changes. Therefore, changes may be advantageously operated either by the user or autonomously by the computer program product, when desired, to relieve the user from this task. The lists resulting therefrom will be increasingly error-free.

In view of the above, the input means 3, 4 generally consist of one or more data input devices, such as keyboards, hard disks, network connections, CD/DVD readers or else.

It will be understood from the above that the invention also concerns the computer program product that can be directly controlled within the memory of the computer 5 as mentioned above, which comprises portions of software code for implementing the method as described hereinbelow, when the computer program product is run by the computer 5.

Therefore, the method of the invention will be now described in detail.

As mentioned above, this method allows computerized change of an irrigation system I, in which the system I comprises a movable bearing structure having a plurality of hydraulic components for water supply and distribution to the soil to be irrigated.

Figure 4:
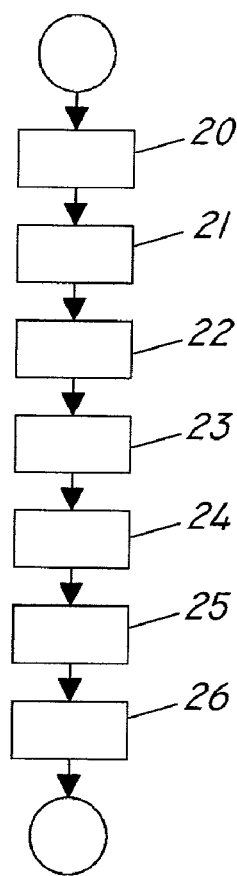
FIG. 4 shows a block diagram of the method of the invention.

Referring now to FIG. 4, the method of the invention, which is shown in the form of a block diagram, comprises the following steps:

a first step, designated by numeral 20, for the provision of the computer unit 5 having one or more storage media 2;

a second step, designated by numeral 21, for the installation, into the computer unit 5, of a computer program product for sizing and changing the system I;

a third step, designated by numeral 22, in which a general database of components susceptible of being used in the system I is loaded onto one of the storage media 2;

a fourth step, designated by numeral 23, in which an initial combination of components defining the configuration of the system I before the change is loaded onto one of the storage media 2;

a fifth step, designated by numeral 24, in which the technical specifications about the final configuration of the changed system I are provided to the computer program product;

a sixth step, designated by numeral 25, in which one or more changes are operated to the system I in accordance with at least the technical specifications about the final configuration of the changed system I.

According to the invention, under step 26 the computer program product is designed to provide at least one first list of components concerned by the changes and at least one second list containing the changes.

These lists are obviously automatically composed by the computer program product by comparing the design of the system I before and after the changes.

More particularly, the changes may include addition, removal and/or replacement of one or more components as well as new location data of one or more of the components that define the configuration of the system I before the change. Also, since each component may be composed of multiple hydraulic elements in mechanical association with each other, the changes may also include the replacement of one or more of such elements in one or more of the components that define the configuration of the system I before the change.

As a result, the first list may include any new components and new elements to be used, whereas the second list may include, in combination therewith or as an alternative thereto, location data of such new components, new location data of components that define the configuration of the system I before the change, any components to be removed or replaced or the replacements of original elements with the new elements, if any.

Concerning location data, such data includes space data suitable to uniquely define the position of the respective components relative to the structure of the initial system I.

In one aspect of the invention, the step 25, in which one or more changes are operated, is carried out by an operator with the help of control means of the computer program product. While these control means generally consist of a keyboard and a mouse, the use of other similar devices is not excluded.

Conveniently, the step 25, in which one or more of said changes are operated, can be autonomously carried out by the computer program product. This may reduce the tasks of the designer to a maximum in which the whole design change process is carried out by the computer program product. It will be appreciated that the changes operated by the computer program product are based on the original technical specifications and on the new specifications that are provided to obtain the desired changed system I.

Thus, the new components and/or elements are selected by respective subcomputer program product from the general database, according to the mechanical features of the original system I and to the new hydraulic features thereof. If selection is allowed among multiple equivalent elements and/or components, in certain variant embodiments the user may be allowed to set selection rules, such as the preference for components and/or elements from the same manufacturer, particular materials, or else.

Concerning component locations, these may be also autonomously selected by the computer program product based on technical specifications concerning water distribution to the underlying crops and agricultural information.

In yet another aspect of the invention, the step 25, in which one or more changes are operated either by an operator or autonomously by the computer program product, is carried out by selecting new components from a group of sets of such components contained in the general database within the storage media 2. Each of these sets is processed by the computer program product by selecting, among all the available components, those having mechanical features compatible with at least the technical specifications of the final configuration of the changed system I, with the components that define the configuration of the system I before the change and remain in the final configuration of the changed system I, and with the new components previously selected during such step of operating changes, in view of ensuring mechanical continuity of the changed system I during assembly thereof.

This advantageously reduces or eliminates error probability in the selection of components and elements as changes are operated.

It will be appreciated that, in this case, since the step 25 in which changes are operated may be entirely assisted by the computer program product, it may be also carried out by an unskilled operator, such as the user of the system.

In an additional variant embodiment of the invention, the computer program product may be also arranged to include a subcomputer program product for computing water distribution coefficients in the changed system I to ensure one or more desired hydraulic and fluid-dynamic parameters during operation of the system.

In this case, the selection of components from each of the sets is processed by the computer program product among all the components contained in the general database that also have hydraulic features compatible with at least the technical specifications of the final configuration of the changed system I, with the components that define the configuration of the system I before the change and remain in the final configuration of the changed system I, and with the new components previously selected in view of also ensuring such desired hydraulic and fluid-dynamic parameters.

In another aspect of the invention, the method my include one or more steps in which the technical specifications and changes are stored in at least one of the storage media 2, to save at least a partial configuration of the changed system I and/or at least a partial composition of one or more of the components.

As a result, the steps 25 and 24, in which changes are operated and technical specifications are provided, also include retrieval of previously loaded and saved changes and technical specifications from the storage media 2, to use at least partially preset configurations, possibly derived from different designs, in the changed system I.

The method of the invention allows changes to be properly operated to the system I by conveniently carrying out the step 25 of operating changes in accordance with the mechanical features of one or more of the components that define the configuration of the system I before the change, to ensure mechanical continuity of the changed system I during assembly.

Concerning the components that compose the system I, these include, for example, distributors G or parts thereof, tubing spans A, water guns, booster pumps, sand and/or particulate drainage elements, water distributor disks. It shall be recalled that each of the components may be composed of a plurality of hydraulic elements assembled together and that, in this case, the design of the system I may be changed by also selecting not only new components but also individual new elements to replace other elements as used in the original system I.

However, concerning the technical specifications, these generally relate to the number of possible distributors G that can be connected to the system I, their location data, the number of spans A, the use of water guns and their number, the hydraulic parameters concerning the water distribution capacity of such guns, the indication of the height of each of such components from the ground. Technical specifications also and especially comprise basic data for designing a system I, such as the hydraulic parameters of water transfer rate by the irrigation system I to be changed, the indication of the amount of available water, the indication of water pressure as measured in at least one section of the system I.

The above disclosure clearly shows that the method and apparatus of the invention fulfill the indented objects, and particularly speed up the tasks of the designer, the personnel charged with new component orders and the technicians that implement changes in the field.

Namely, in some of its variants, the invention allows all the above tasks to be directly carried out by the user, thereby relieving the technical personnel therefrom and hence reducing the costs for changing an irrigation system.

It shall be understood that the method and apparatus of the invention are susceptible of a number of changes and variants in addition to those mentioned above, within the inventive principle as disclosed in the appended claims.

Furthermore, all the details may be replaced by technically equivalent elements or steps, and any size, shape and material may be used according to various needs.

The invention claimed is:

1. A computerized method for operating changes to an irrigation system, wherein said system comprises a movable bearing structure having a plurality of hydraulic components for water supply and distribution to a soil to be irrigated, the method comprising the following steps:

providing a computer apparatus having one or more storage media;

installing, into said computer apparatus, a computer program product for sizing and changing the system;

loading, onto one of said storage media, a general database of components susceptible of being used in the system;

loading, onto one of said storage media, an initial combination of said components defining a configuration of the system before the change;

providing said computer program product with technical specifications about a final configuration of the changed system; and operating one or more changes to said system in accordance at least with said technical specifications of the final configuration of the changed system, wherein said computer program indicates the components of the system to be added, moved to a different location, removed, or replaced, and wherein said computer program product is designed to provide at least one first list of said components concerned by said changes and at least one second list containing said changes.

2. The method as claimed in claim 1, wherein said changes comprise an addition of one or more new components to said components defining the configuration of the system before the change.

3. The method as claimed in claim 2, wherein said first list comprises said new components and said second list comprises a location data of said new components.

4. The method as claimed in claim 1, wherein said changes comprise new location data of one or more of said components defining the configuration of the system before the change.

5. The method as claimed in claim 4 wherein said second list comprises said new location data.

6. The method as claimed in claim 5, wherein said changes comprise removal and/or replacement of one or more of said components defining the configuration of the system before the change.

7. The method as claimed in claim 6, wherein said second list comprises an indication of said components to be removed and/or replaced.

8. The method as claimed in claim 5, wherein each of said components is composed of a plurality of hydraulic elements mechanically associated with each other.

9. The method as claimed in claim 8, wherein said changes comprise a replacement of one or more of said elements in one or more of said components defining the configuration of the system before the change, new elements being contained in said general database.

10. The method as claimed in claim 9, wherein said first list comprises said new elements and said second list comprises said replacements of said elements of said components defining the configuration of the system before the change, inclusive of said new elements.

11. The method as claimed in claim 5, wherein said location data comprises space data adapted to uniquely define a position of the respective components relative to the structure of the initial system.

12. The method as claimed in claim 1, wherein said step of operating one or more of said changes is autonomously carried out by said computer program product to provide said final configuration, or by an operator through control means of said computer program product.

13. The method as claimed in claim 12, wherein said control means comprise at least one keyboard or at least one mouse.

14. The method as claimed in claim 1, wherein said step of operating one or more changes is carried out by selecting new components from a group of sets of said components contained in said general database within said storage media, each of said sets of said group being processed by said computer program product by selecting, among all the available components, those components having mechanical properties compatible with at least said technical specifications of the final configuration of the changed system, with said components defining the configuration of the system before the change and remaining in the final configuration of the changed system, and with said new components previously selected during said step of operating said changes among one or more of said sets, such to ensure mechanical continuity of said changed system during assembly thereof.

15. The method as claimed in claim 14, wherein said computer program product comprises a subcomputer program product for computing water distribution coefficients in said changed system, to ensure one or more desired fluid-dynamic parameters during operation of said changed system.

16. The method as claimed in claim 15, wherein said selection of said components from each of said sets is processed by said computer program product among all the components contained in said general database which also have hydraulic properties compatible with at least said technical specifications of the final configuration of the changed system, with said components defining the configuration of the system before the change and remaining in the final configuration of the changed system, and with said new components previously selected during said step of operating said changes among one or more of said sets, such to ensure one or more desired fluid-dynamic parameters.

17. The method as claimed in claim 1, further comprising one or more steps in which said technical specifications and said changes are stored into at least one of said storage media to save one or more of a partial configuration of said changed system or at least a partial composition of one or more of said components.

18. The method as claimed in claim 17, wherein said steps in which changes are operated and technical specifications are loaded further comprise retrieving previously loaded and saved changes and technical specifications from said storage media, to load at least partially preset configurations in said changed system.

19. The method as claimed in claim 1, wherein said step of operating said changes is carried out in accordance with mechanical features of one or more of said components defining the configuration of the system before the change to ensure mechanical continuity of said changed system during assembly thereof.

20. The method as claimed in claim 1, wherein said components comprise one or more distributors, one or more tubing spans, one or more water guns, one or more booster pumps, one or more of sand or particulate drainage elements, or one or more water distributor disks.

21. The method as claimed in claim 20, wherein said technical specifications comprise a number of possible distributors connectable to said irrigation system and location data thereof.

22. The method as claimed in claim 20, wherein said technical specifications comprise the number of said spans.

23. The method as claimed in claim 20, wherein said technical specifications comprise hydraulic parameters representative of water delivery capacity of said water guns.

24. The method as claimed in claim 1, wherein said technical specifications comprise one or more hydraulic parameters representative of water transfer rate by said irrigation system.

25. The method as claimed in claim 1, wherein said technical specifications comprise an indication of an amount of available water, an indication of water pressure measured in one section of said irrigation system, or an indication of a height of each of said components from the ground.

26. The method as claimed in claim 1, wherein said computer apparatus is a central computer server suitable to be remotely accessed by client computers.

27. The method as claimed in claim 26, wherein said access to said central computer server occurs by an authentication process.

28. The method as claimed in claim 26, wherein said client computers are connected to said central computer server via web access.

29. A computer apparatus for computerized change of an irrigation system of a type comprising a movable bearing structure having a plurality of hydraulic components for water supply and distribution to a soil to be irrigated, comprising:

one or more storage media configured to store at least one computer program product for designing said irrigation system, said one or more storage media comprising a general database of components susceptible of being used into the irrigation system, said computer program indicating the components of the system to be added, moved to a different location, removed, or replaced;

first loading means, into said storage media, for loading an initial combination of said components defining a configuration of the system before change;

second loading means, into said computer program product, for loading technical specifications about a final configuration of the changed system;

at least one computer unit configured to run said computer program product to process one or more changes of said system according to at least said technical specifications of the final configuration of the changed system, and to provide at least one first list of said components concerned by said changes and at least one second list containing said changes; and display means for displaying said lists.

30. The apparatus as claimed in claim 29, wherein said computer unit includes at least one computer, at least one central computer server, or one or more client computers connectable to said central computer server.

31. The apparatus as claimed in claim 29, further comprising a subcomputer program product suitable to be run by said computer unit to operate one or more of said changes.

32. The apparatus as claimed in claim 29, further comprising selector means available to an operator to operate one or more of said changes.

33. The apparatus as claimed in claim 32, wherein said selector means comprise one or more data loading devices.

34. The apparatus as claimed in claim 29, wherein one or more of said first or second loading means comprise one or more data loading devices available to an operator.

35. A computer program product directly controllable within a memory of a computer and comprising software code portions for carrying out the method as claimed in claim 1, when said computer program product is run by said computer.

* * * * *